A. C. WALWORTH, Jr.
ANTISKID DEVICE FOR AUTOMOBILE AND LIKE TIRES.
APPLICATION FILED JUNE 8, 1916.
1,282,336. Patented Oct. 22, 1918.
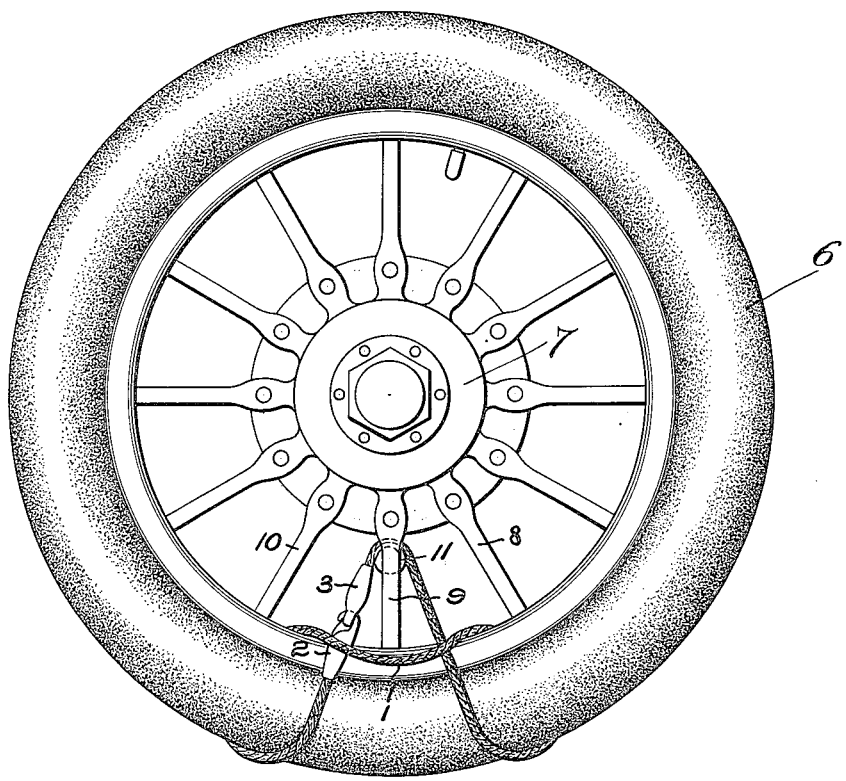
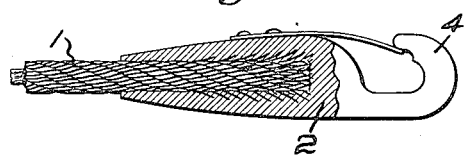
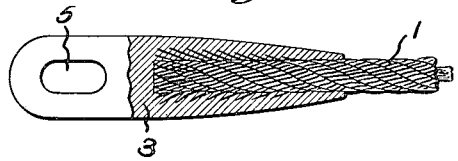
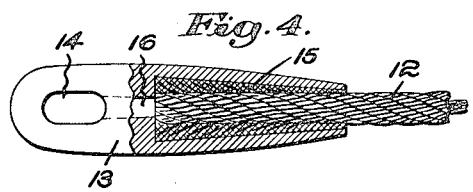
Inventor:
Arthur Clarence Walworth, Jr.
by Emery, Booth, Janney & Varney
Attys.

UNITED STATES PATENT OFFICE.

ARTHUR CLARENCE WALWORTH, JR., OF NEWTON, MASSACHUSETTS.

ANTISKID DEVICE FOR AUTOMOBILE AND LIKE TIRES.

1,282,336. Specification of Letters Patent. Patented Oct. 22, 1918.

Application filed June 8, 1916. Serial No. 102,567.

*To all whom it may concern:*

Be it known that I, ARTHUR CLARENCE WALWORTH, Jr., a citizen of the United States, and a resident of Newton, in the county of Middlesex and State of Massachusetts, have invented an Improvement in Antiskid Devices for Automobile and like Tires, of which the following description, in connection with the accompanying drawings, is a specification, like characters on the drawings representing like parts.

This invention relates to anti-skid devices for automobiles and other tires.

In order that the principle of the invention may be readily understood, I have disclosed a single embodiment thereof in the accompanying drawings, wherein—

Figure 1 is a side elevation of an automobile wheel and tire having my invention applied thereto;

Fig. 2 is a view, partially in side elevation and partially broken away, showing one embodiment of means for securing a fastening element to the wire rope of the antiskid device;

Fig. 3 is a similar view of the other end of the wire rope and the fastening device therefor; and Fig. 4 is a view partially in side elevation and partially in section of a modified form of my invention.

It has heretofore been proposed to employ wire ropes as anti-skid devices for automobile tires, but so far as I am aware no effective means has yet been produced for securing the ends of such wire rope. It has been proposed to employ wire ropes for this general purpose in endless form, but inasmuch as the rope to be effective for the purpose must be of considerable diameter, it has thus far been impossible suitably to flex or bend the wire rope when in endless form or to secure the ends thereof.

An important object of my invention is to provide one or both ends of a wire rope with a fastening device that will not impair the strength of the rope and which may be readily attached to some suitable support or to the fastening means at the other end of the rope.

I have diagrammatically indicated a wire rope at 1 in the several figures of the drawing. While it may be of any suitable character, it is preferably made of six or eight, or even more, strands, and is entirely metallic, in order that it may not be burned or the strength thereof be seriously impaired when applying the end fastening means thereto in accordance with my invention. In accordance with my invention, I cast about one or both ends of the wire rope a fastening device preferably of malleable iron or steel, such fastening device for one end of the rope being indicated at 2 and for the other end of the rope being indicated at 3. The fastening device 2 is provided with a hook portion 4 and the fastening device 3 is provided with an opening 5 for the reception of said hook. The form and character of the said fastening devices 2 and 3 may, however, be suitably varied within the scope of my invention.

If desired the end or ends of the wire rope 1 may be somewhat frayed or separated or doubled backward before the metal is positioned thereabout. In the course of my experiments I have ascertained that there is danger of crystallizing more or less the end or ends of the rope in casting the metal of the fastening means thereabout, or of otherwise injuring the same, but I have been enabled by properly guarding against the employment of an excess amount of heat and by excluding as far as possible the air from direct access to the ends of the rope in the casting operation to avoid such danger or to limit the effects thereof to a minimum. Moreover, I have ascertained that such crystallizing of the rope or impairment thereof as occurs during the casting process can be taken out largely or wholly in the annealing or heat treatment of the rope and its end fastenings after the casting operation.

The cast metal in the molding operation enters intimately between the strands or elements of the wire rope and into the interstices thereof, thereby to secure a very effective union between the parts at a relatively slight expense.

My invention is not limited to the employment or use of any particular casting means or process, but such process should for best results be such as to minimize to the greatest degree possible the crystallization or impairment of the wire rope. The ensuing annealing or heat treatment should be continued sufficiently long and at such temperatures as to restore the rope 1 to its original condition and strength.

A wire rope with fastening means constructed in accordance with my invention may be applied to an automobile wheel or other support in any suitable manner. In Fig. 1, I have diagrammatically indicated an automobile wheel at 6, the hub being shown at 7 and certain of the spokes at 8, 9 and 10. Upon the spoke 9 I have secured a bracket or hook like member 11 and have represented the rope 1 as passed about said member and thence about the tire as shown.

In Fig. 4, I have represented a somewhat modified form of my invention. Therein one end of the rope is indicated at 12 and the fastening device therefor at 13, such fastening device being here represented as the one having an opening 14 therein. It is evident, however, that both ends of the rope may be provided with suitable fastening devices in accordance with this embodiment of my invention. The said fastening device 13 is provided with a tapering socket or recess 15 which is in communication by a restricted passage 16 with the opening 14 or is otherwise in communication with the exterior. The end of the wire rope 12 is suitably positioned in or with respect to the mold and the fastening element 13 is cast thereabout as described in connection with that form of my invention shown in Figs. 2 and 3. The socket or recess 15 is, however, preserved, and thereinto subsequent to the casting process I force through the opening 16 or otherwise a suitable quantity of Babbitt or other metal. The socket or recess 15 may be preserved in any suitable manner, as by wrapping material about the end of the wire loop 12 prior to the casting operation and adapted to be replaced by the Babbitt or other metal. Preferably the end portions of the strands of the wire rope 12 are spread apart prior to the casting, so that when the Babbitt metal is cast into place, it enters between the strands and assists in holding the end of the rope in place within the cast metal. The end of the rope is thus secured firmly to the fastening by the Babbitt metal cast about the rope and permeating the interstices between the strands thereof.

In cases where the end fastening is cast about the end of the rope as described, it may be annealed after the casting operation and before the application of the Babbitt metal substantially as described in the other forms of my invention.

By reducing to a minimum the impairment of the structure of the wire rope in or consequent upon the casting operation, by the subsequent annealing process and by the application of Babbitt or other metal, I secure an extremely strong fastening means for the end or ends of the wire rope.

It will be evident from the foregoing description that I have provided means whereby the ends of a wire rope when used for anti-skid devices or for other purposes may be readily and simply secured together. The rope 1 is passed in two complete loops about the tire of the wheel and the other part of the rope including the two ends 2, 3 is passed in a bight about the bracket or hook like member 11. The said loops bind upon the tire but do not rigidly engage the same. During travel first one and then the other of said loops engages the road and the result is to loosen the loop that is engaging the road, thereby tightening the other loop. In the further rotation of the wheel, this action is reversed and in the continued rotation first one and then the other loop is loosened with the consequent tightening of the other loop.

Having thus described one illustrative embodiment of my invention, I desire it to be understood that although specific terms are employed, they are used in a generic and descriptive sense and not for purposes of limitation, the scope of the invention being set forth in the following claims.

Claims:

1. An anti-skid device for automobile tires comprising a metallic rope, the ends whereof are connected, said rope being passed about the tire upon the wheel in two complete spaced loops, a portion of the rope between said loops extending in a bight about a support upon the wheel, said loops engaging the surface of the tire with a binding action, but permitting an alternate tightening and loosening of said loops as each engages and leaves the road.

2. An anti-skid device for automobile tires comprising a metallic wire rope having its ends detachably connected, thus forming an endless band, said rope being passed in two complete but spaced loops about the tire upon the wheel, a part of said rope intermediate said loops and including the ends of said rope extending in a bight about a support upon said wheel, said loops engaging the surface of the tire with a binding action, but permitting an alternate tightening and loosening of said loops as each engages and leaves the road.

3. An anti-skid device for automobile tires comprising a wholly metallic wire rope 1 having ends 2, 3 adapted to be detachably interengaged, said rope extending in two complete spaced loops about the tire upon the wheel, a portion of said rope between said loops and including the ends 2, 3 being passed about a suitable support upon the wheel, and the remaining portion of said rope extending from one of said loops directly to the other, said loops engaging the surface of the tire with a binding action, but permitting an alternate tightening and loosening of said loops as each engages and leaves the road.

In testimony whereof, I have signed my name to this specification.

ARTHUR CLARENCE WALWORTH, Jr.